United States Patent
Shigematsu

(10) Patent No.: US 7,215,501 B2
(45) Date of Patent: May 8, 2007

(54) DISK DEVICE, DISK ECCENTRICITY CONTROL METHOD, AND RECORDING MEDIUM

(75) Inventor: Norio Shigematsu, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 436 days.

(21) Appl. No.: 10/510,494

(22) PCT Filed: Aug. 1, 2003

(86) PCT No.: PCT/JP03/09785

§ 371 (c)(1),
(2), (4) Date: Oct. 7, 2004

(87) PCT Pub. No.: WO2004/013855

PCT Pub. Date: Feb. 12, 2004

(65) Prior Publication Data

US 2006/0268448 A1    Nov. 30, 2006

(30) Foreign Application Priority Data

Aug. 2, 2002 (JP) .............................. 2002-226300

(51) Int. Cl.
*G11B 5/596* (2006.01)
(52) U.S. Cl. .................................................. 360/77.04

(58) Field of Classification Search .................... None
See application file for complete search history.

(56) References Cited

U.S. PATENT DOCUMENTS

| | | | | |
|---|---|---|---|---|
| 6,768,705 B2 * | 7/2004 | Hirai | ........................ | 369/44.28 |
| 6,894,862 B2 * | 5/2005 | Kusumoto | ............... | 360/77.04 |
| 6,947,243 B2 * | 9/2005 | Dang et al. | ................... | 360/75 |

FOREIGN PATENT DOCUMENTS

| | | |
|---|---|---|
| JP | 2-42691 | 2/1990 |
| JP | 2-246063 | 10/1990 |
| JP | 11-39814 | 2/1999 |
| JP | 2001-189063 | 7/2001 |
| JP | 2002-230928 | 8/2002 |
| JP | 2003-123415 | 4/2003 |

* cited by examiner

*Primary Examiner*—K. Wong
(74) *Attorney, Agent, or Firm*—Wenderoth, Lind & Ponack, L.L.P.

(57) ABSTRACT

Weight factors corresponding to plural areas into which a disk is concentrically divided, respectively, are previously stored, and an amount of eccentricity control is calculated using the previously-stored weight factors during settling operation. Further, when an impact larger than a predetermined value is applied, calculation of weight factors is stopped. Thereby, the seek time can be shortened, and positioning of the head can be stabilized.

21 Claims, 8 Drawing Sheets

DISK DEVICE, DISK ECCENTRICITY CONTROL METHOD, AND RECORDING MEDIUM

TECHNICAL FIELD

The present invention relates to a disk device, a disk eccentricity control method, and a recording medium and, more particularly, to those for making a head follow a target track on an eccentric disk.

BACKGROUND ART

In order to record or reproduce information on/from a target track on an eccentric disk by using a head, a disk device must drive the head make the head follow the target track whose distance from the center of rotation continuously varies due to eccentricity. Hereinafter, an HDD (Hard Disk Drive) will be described as an example.

FIG. 8 is a block diagram illustrating a conventional HDD. As shown in FIG. 8, the conventional HDD is provided with a magnetic head 819 for recording or reproducing information on/from a magnetic disk 815 to output a head position signal 806; an actuator mechanism for operating the magnetic head 819 on the basis of a magnetic head control amount signal 809; a phase learning unit 801 for learning a phase shift amount which is a phase difference between variations in the servo information number that are read by the magnetic head 819 and variations in the amount of eccentricity of the magnetic disk 815, and outputting a phase shift amount signal 812; a sinusoidal wave generator 802 for outputting an eccentricity sync sinusoidal signal 813 having the phase shift amount that is learned by the phase learning unit 801, at a frequency synchronized with the rotation frequency of the magnetic disk 815; an eccentricity control amount calculator 803 for multiplying the sinusoidal signal by a weight factor to obtain an eccentricity control amount, and performing learning of eccentricity amount and updation of weight factor to output an eccentricity control amount signal 804; a positioning controller 808 for adding the eccentricity control amount to an ordinary feedback control amount to calculate a magnetic head control amount for compensating the eccentricity of the magnetic disk 815 and making the magnetic disk 819 follow a target track, and outputting a magnetic head control amount signal 809; a subtracter 820 for subtracting the head position signal 806 from a target position signal 805 that is externally input, and outputting a positional error signal 807 as a result of subtraction; and a learning switch 811 for selecting whether learning of eccentricity amount and updation of weight factor are to be carried out or not.

When performing seeking of the magnetic head 819, the learning switch 811 is turned off, whereby the eccentricity control amount calculator 803 temporarily stops learning of eccentricity amount and updation of weight factor. After the operation of the disk device changes from seeking to settling, calculation of an eccentricity control amount is carried out using a weight factor that has been calculated just before the stop, and the learning switch 811 is turned on to resume learning of eccentricity amount and updation of weight factor when the magnetic head 819 enters in a predetermined positioning range, thereby preventing degradation of controllability during settling.

Further, when the magnetic head 819 is unintentionally moved due to an impact or the like applied from the outside and thereby the positioning error of the magnetic head 819 exceeds the predetermined value, the learning switch 811 is turned off to stop learning of eccentricity amount and updation of weight factor. When the magnetic head 819 enters in the predetermined positioning range, the learning switch 811 is turned on to resume learning of eccentricity amount and updation of weight factor, thereby preventing degradation of controllability.

In the conventional disk device described above, when performing seeking, calculation of eccentricity control amount, learning of eccentricity amount, and updation of weight factor are temporarily stopped. After the operation of the disk device changes from seeking to settling, calculation of an eccentricity control amount is carried out using a weight factor that is calculated just before the stop, and learning of eccentricity amount and updation of weight factor are resumed when the magnetic head enters in the predetermined positioning range. However, since the value of weight factor varies depending on the target track on which the magnetic head should be positioned, convergence of weight factor takes time, resulting in an increase in seek time.

Further, even when an impact or the like is applied from the outside, since learning of eccentricity amount and updation of weight factor are carried out until the positioning error of the magnetic head exceeds the predetermined value, there may occur cases where the eccentricity control amount is not correctly calculated, resulting in degradation of controllability.

The present invention is made to solve the above-described problems and has for its object to provide a disk device, a disk eccentricity control method, and a recording medium, which can reduce seek time, and stabilize positioning of head.

DISCLOSURE OF THE INVENTION

A disk device according to the present invention (Claim 1) comprises a head for reading a plurality of servo information which have a series of servo information numbers and are recorded on a disk; a phase learning means for learning a phase error amount which is a phase difference between a sawtooth waveform indicating variations in the servo information number that is read by the head and a sinusoidal wave indicating variations in the amount of eccentricity of the disk; a subtraction means for detecting a positional error of the head on the basis of a target position of the head that is supplied from the outside, and the current position of the head; a sinusoidal wave generation means for generating an eccentricity sync sinusoidal wave having the phase error amount learned by the phase learning means, at a frequency synchronized with a rotation frequency of the disk; an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount; a positioning control means for controlling positioning of the head on the basis of the positional error of the head and the eccentricity control amount; and an eccentricity control amount initial learning means for previously storing the phase error amount learned by the phase learning means, and a weight factor of each of plural areas into which the disk is concentrically divided; and, during a settling operation, the eccentricity control amount calculation means reads a phase error amount and a weight factor corresponding to the target position of the head from the eccentricity control amount initial learning means, and calculates an eccentricity control amount using the phase error amount and the weight factor which have been read out.

According to the present invention (Claim 1), even when the value of the weight factor at the inner circumference of the disk differs from that at the outer circumference, the time from when the disk device enters into the tracking operation and resumes learning and calculation of weight factor to when the weight factors converge is shortened, whereby the seek time can be shortened.

A disk device according to the present invention (Claim 2) is the disk device defined in Claim 1, wherein the eccentricity control amount initial learning means previously stores an approximate expression that expresses the relationship between a weight factor of each of the plural areas into which the disk is concentrically divided, and the target position of the head, instead of the phase error amount learned by the phase learning means and the weight factor; and, during the settling operation, the eccentricity control amount calculation means reads the phase error amount and the approximate expression corresponding to the target position of the head from the eccentricity control amount initial learning means, and calculates a weight factor corresponding to the target position of the head from the read approximate expression, and further, calculates an eccentricity control amount using the calculated weight factor and the read phase error amount.

According to the present invention (Claim 2), even when the value of the weight factor significantly varies among the areas into which the disk is concentrically divided, the time from when the disk device enters into the tracking operation and resumes learning and calculation of weight factors to when the weight factors converge is shortened, whereby the seek time can be shortened.

A disk device according to the present invention (Claim 3) is the disk device defined in Claim 1 further including a plurality of heads for reading a plurality of servo information which have a series of servo information numbers and are recorded on a plurality of disk surfaces, the heads being provided for the respective disk surfaces; and the eccentricity control amount initial learning means previously stores the phase error amount learned by the phase learning means, and a weight factor of each of the plural areas into which the disk is concentrically divided on each of the disk surfaces read by the respective heads; wherein, during a head switching operation, the eccentricity control amount calculation means reads a phase error amount and a weight factor corresponding to the target position of the head after head switching, from the eccentricity control amount initial learning means, and calculates an eccentricity control amount using the phase error amount and the weight factor which have been read out.

According to the present invention (Claim 3), the head switching time can be shortened.

A disk device according to the present invention (Claim 4) is the disk device defined in Claim 1 further including a plurality of heads for reading a plurality of servo information which have a series of servo information numbers and are recorded on a plurality of disks, respectively; wherein the eccentricity control amount initial learning means previously stores the phase error amount learned by the phase error means, and a weight factor of each of the plural areas into which each disk is concentrically divided; and, during a head switching operation to a head on a different disk, the eccentricity control amount calculation means reads a phase error amount and a weight factor corresponding to the target position of the head after the head switching, from the eccentricity control amount initial learning means, and calculates an eccentricity control amount using the phase error amount and the weight factor which have been read out.

According to the present invention (Claim 4), the head switching time can be shortened.

A disk device according to the present invention (Claim 5) comprises: a head for reading a plurality of servo information which have a series of servo information numbers and are recorded on a disk; a phase learning means for learning a phase error amount which is a phase difference between a sawtooth waveform indicating a change in the servo information number read by the head and a sinusoidal wave indicating a change in an amount of eccentricity of the disk; a first subtraction means for calculating an positional error and a remaining distance of the head, on the basis of a target position of the head that is supplied from the outside, and the current position of the head; a sinusoidal wave generation means for generating an eccentricity sync sinusoidal wave having the phase error amount learned by the phase learning means, at a frequency synchronized with the rotation frequency of the disk; an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount; a positioning control means for controlling positioning of the head on the basis of the positional error of the head and the eccentricity control amount, during settling operation and tracking operation; an eccentricity control amount initial learning means for previously storing the phase error amount learned by the phase learning means, and a weight factor of each of plural areas into which the disk is concentrically divided; a reference speed calculation means for calculating a target speed according to the remaining distance of the head; a head speed calculation means for calculating an actual moving speed of the head; a second subtraction means for calculating a speed error of the head on the basis of the actual moving speed of the head and the target speed; and a speed control means for controlling, during seek operation, positioning of the head by using the speed error of the head that is calculated by the second subtraction means, and an eccentricity control amount that is calculated by the eccentricity control amount calculation means using a phase error amount and a weight factor corresponding to the current position of the head, which are stored in the eccentricity control amount initial learning means.

According to the present invention (Claim 5), an accurate head position can be detected, whereby the seek operation can be carried out with stability.

A disk device according to the present invention (Claim 6) comprises: a head for reading a plurality of servo information which have a series of servo information numbers and are recorded on a disk; a phase learning means for learning a phase error amount which is a phase difference between a sawtooth waveform indicating variations in the servo information number read by the head and a sinusoidal wave indicating variations in the amount of eccentricity of the disk; a subtraction means for detecting a positional error of the head on the basis of a target position of the head that is supplied from the outside, and the current position of the head; a sinusoidal wave generation means for generating an eccentricity sync sinusoidal wave having the phase error amount learned by the phase learning means, at a frequency synchronized with the rotation frequency of the disk; an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount; a positioning control means for controlling positioning of the head on the basis of the positional error of the head and the eccentricity control amount; a positional error change amount calculation means for calculating an amount of change in the positional error of the head; and an eccentricity learning switching judgement means for making the eccentricity control amount calculation means stop calculation of weight factor when the amount of change calculated by the positional error change amount calculation means exceeds a predetermined value.

According to the present invention (Claim 6), even when the head is moved by an impact or the like, positioning of the head can be carried out with stability.

A disk device according to the present invention (Claim 7) comprises: a head for reading a plurality of servo information which have a series of servo information numbers and are recorded on a disk; a phase learning means for learning a phase error amount which is a phase difference between a sawtooth waveform indicating variations in the servo information number read by the head and a sinusoidal wave indicating variations in the amount of eccentricity of the disk; a subtraction means for detecting a positional error of the head on the basis of a target position of the head that is supplied from the outside, and the current position of the head; a sinusoidal wave generation means for generating an eccentricity sync sinusoidal wave having the phase error amount learned by the phase learning means, at a frequency synchronized with the rotation frequency of the disk; an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount; a positioning control means for controlling positioning of the head on the basis of the positional error of the head and the eccentricity control amount; an impact detection means for outputting a voltage according to an impact that is applied to the disk device from the outside; and an eccentricity learning switching judgement means for making the eccentricity control amount calculation means stop calculation of weight factor when the voltage outputted from the impact detection means exceeds a predetermined value.

According to the present invention (Claim 7), even when the head is moved by an impact or the like, positioning of the head can be carried out with stability.

A disk eccentricity control method according to the present invention (Claim 8) comprises: previously storing a phase error amount which is a phase difference between a sawtooth waveform indicating variations in the servo information number read by the head and a sinusoidal wave indicating variations in the amount of eccentricity of the disk, and a weight factor of each of plural areas into which the disk is concentrically divided; and, during a settling operation, reading a phase error amount and a weight factor corresponding to a target position of the head from the phase error amounts and the weight factors which have previously been stored, and calculating an eccentricity control amount using the phase error amount and the weight factor which have been read out.

According to the present invention (Claim 8), even when the value of the weight factor at the inner circumference of the disk differs from that at the outer circumference, the time from when the disk device enters into the tracking operation and resumes learning and calculation of weight factors to when the weight factors converge is shortened, whereby the seek time can be shortened.

A disk eccentricity control method according to the present invention (Claim 9) comprises: previously storing a phase error amount which is a phase difference between a sawtooth waveform indicating variations in the servo information number read by the head and a sinusoidal wave indicating variations in the amount of eccentricity of the disk, and an approximate expression which expresses the relationship between a weight factor of each of plural areas into which the disk is concentrically divided and a target position of the head; and, during a settling operation, reading a phase error amount and an approximate expression corresponding to the target position of the head from the phase error amounts and the approximate expressions which have previously been stored, and calculating a weight factor corresponding to the target position of the head from the read approximate expression, and further, calculating an eccentricity control amount using the calculated weight factor and the read phase error amount.

According to the present invention (Claim 9), even when the value of the weight factor significantly varies among the areas into which the disk is concentrically divided, the time from when the disk-device enters into the tracking operation and resumes learning and calculation of weight factors to when the weight factors converge is shortened, whereby the seek time is shortened.

A disk eccentricity control method according to the present invention (Claim 10) comprises: previously storing a phase error amount which is a phase difference between a sawtooth waveform indicating variations in the servo information number read by the head and a sinusoidal wave indicating variations in the amount of eccentricity of the disk, and a weight factor of each of plural areas into which the disk is concentrically divided on each of disk surfaces read by plural heads, respectively; and, during a head switching operation, reading a phase error amount and a weight factor corresponding to the target position of the head after the head switching, from the phase error amounts and the weight factors which have previously been stored, and calculating an eccentricity control amount using the phase error amount and the weight factor which have been read out.

According to the present invention (Claim 10), the head switching time can be shortened.

A disk eccentricity control method according to the present invention (Claim 11) comprises: previously storing a phase error amount which is a phase difference between a sawtooth waveform indicating variations in the servo information number read by the head and a sinusoidal wave indicating variations in the amount of eccentricity of the disk, and a phase error amount and a weight factor corresponding to each of plural areas into which each of plural disks is concentrically divided; and, during a head switching operation to a head on a different disk, reading a phase error amount and a weight factor corresponding to the target position of the head after the head switching, from the phase error amounts and the weight factors which have previously been stored, and calculating an eccentricity control amount using the phase error amount and the weight factor which have been read out.

According to the present invention (Claim 11), the head switching time can be shortened.

A disk eccentricity control method according to the present invention (Claim 12) comprises: calculating a positional error and a remaining distance of a head on the basis of a target position of the head which is externally input, and a current position of the head; calculating a target speed according to the remaining distance of the head; calculating an actual moving speed of the head; calculating a speed error of the head on the basis of the actual moving speed and the target speed of the head; previously storing a phase error amount which is a phase difference between a sawtooth-waveform indicating variations in the servo information number read by the head and a sinusoidal wave indicating variations in the amount of eccentricity of the disk, and a weight factor corresponding to each of plural areas into which the disk is concentrically divided; and, during a seek operation, calculating an eccentricity control amount using a phase error amount and a weight factor which correspond to the current position of the head and are previously stored, and controlling positioning of the head using the calculated eccentricity control amount and the calculated speed error of the head.

According to the present invention (Claim 12), an accurate head position can be detected, whereby the seek operation can be carried out with stability.

A disk eccentricity control method according to the present invention (Claim 13) comprises: calculating a positional error of a head on the basis of a target position of the head which is supplied from the outside, and a current position of the head; calculating an amount of change in the positional error of the head; and stopping calculation of weight factor when the calculated amount of change in the positional error of the head exceeds a predetermined value.

According to the present invention (Claim 13), even when the head is moved by an impact or the like, positioning of the head can be carried out with stability.

A disk eccentricity control method according to the present invention (Claim 14) comprises: detecting an impact applied from outside a device; converting the detected impact into a voltage, and outputting the voltage; and stopping calculation of weight factor when the outputted voltage exceeds a predetermined value.

According to the present invention (Claim 14), even when the head is moved by an impact or the like, positioning of the head can be carried out with stability.

A recording medium according to the present invention (Claim 15) contains a program comprising: previously storing a phase error amount which is a phase difference between a sawtooth waveform indicating variations in the servo information number read by a head and a sinusoidal wave indicating variations in the amount of eccentricity of a disk, and a weight factor of each of plural areas into which the disk is concentrically divided; and during a settling operation, reading a phase error amount and a weight factor corresponding to a target position of the head from the phase error amounts and the weight factors which have previously been stored, and calculating an eccentricity control amount using the phase error amount and the weight factor which have been read out.

According to the present invention (Claim 15), even when the value of the weight factor at the inner circumference of the disk differs from that at the outer circumference, the time from when the disk device enters into the tracking operation and resumes learning and calculation of weight factor to when the weight factors converge is shortened, whereby the seek time can be shortened.

A recording medium according to the present invention (Claim 16) contains a program comprising: previously storing a phase error amount which is a phase difference between a sawtooth waveform indicating variations in the servo information number read by a head and a sinusoidal wave indicating variations in the amount of eccentricity of a disk, and an approximate expression which expresses the relationship between a weight factor of each of plural areas into which the disk is concentrically divided and a target position of the head; and during a settling operation, reading a phase error amount and an approximate expression corresponding to the target position of the head from the phase error amounts and the approximate expressions which have previously been stored, and calculating a weight factor corresponding to the target position of the head from the read approximate expression, and further, calculating an eccentricity control amount using the calculated weight factor and the read phase error amount.

According to the present invention (Claim 16), even when the value of the weight factor significantly varies among the areas into which the disk is concentrically divided, the time from when the disk device enters into the tracking operation and resumes learning and calculation of weight factors to when the weight factors converge is shortened, whereby the seek time can be shortened.

A recording medium according to the present invention (Claim 17) contains a program comprising: previously storing a phase error amount which is a phase difference between a sawtooth waveform indicating variations in the servo information number read by a head and a sinusoidal wave indicating variations in the amount of eccentricity of a disk, and a weight factor of each of plural areas into which the disk is concentrically divided on each of disk surfaces that are read by plural heads, respectively; and during a head switching operation, reading a phase error amount and a weight factor corresponding to the target position of the head after the head switching, from the phase error amounts and the weight factors which have previously been stored, and calculating an eccentricity control amount using the phase error amount and the weight factor which have been read.

According to the present invention (Claim 17), the head switching time can be shortened.

A disk eccentricity control method according to the present invention (Claim 18) comprises: previously storing a phase error amount which is a phase difference between a sawtooth waveform indicating variations in the servo information number read by a head and a sinusoidal wave indicating variations in the amount of eccentricity of a disk, and a phase error amount and a weight factor corresponding to each of plural areas into which each of plural disks is concentrically divided; and during a head switching operation to a head on a different disk, reading a phase error amount and a weight factor corresponding to the target position of the head after the head switching, from the phase error amounts and the weight factors which have previously been stored, and calculating an eccentricity control amount using the phase error amount and the weight factor which have been read out.

According to the present invention (Claim 18), the head switching time can be shortened.

A recording medium according to the present invention (Claim 19) contains a program comprising: calculating a positional error and a remaining distance of a head on the basis of a target position of the head which is externally input, and a current position of the head; calculating a target speed according to the remaining distance of the head; calculating an actual moving speed of the head; calculating a speed error of the head on the basis of the actual moving speed and the target speed of the head; previously storing a phase error amount which is a phase difference between a sawtooth waveform indicating variations in the servo information number read by the head and a sinusoidal wave indicating variations in the amount of eccentricity of a disk, and a weight factor corresponding to each of plural areas into which the disk is concentrically divided; and during a seek operation, calculating an eccentricity control amount using a phase error amount and a weight factor corresponding to the current position of the head, which have previously been stored, and controlling positioning of the head using the calculated eccentricity control amount and the calculated speed error of the head.

According to the present invention (Claim 19), an accurate head position can be detected, whereby the seek operation can be carried out with stability.

A recording medium according to the present invention (Claim 20) contains a program comprising: calculating a positional error of a head on the basis of a target position of the head which is supplied from the outside, and a current position of the head; calculating an amount of change in the positional error of the head; and stopping calculation of weight factor when the calculated amount of change in the positional error of the head exceeds a predetermined value.

According to the present invention (Claim 20), even when the head is moved by an impact or the like, positioning of the head can be carried out with stability.

A recording medium according to the present invention (Claim 21) contains a program comprising: detecting an impact applied from outside a device; converting the detected impact into a voltage, and outputting the voltage; and stopping calculation of weight factor when the outputted voltage exceeds a predetermined value.

According to the present invention (Claim 21), even when the head is moved by an impact or the like, positioning of the head can be carried out with stability.

BEST MODE TO EXECUTE THE INVENTION

Although the present invention is applicable to any disk device, an HDD (Hard Disk Drive) is taken as an example hereinafter.

Embodiment 1.

Figure 2:
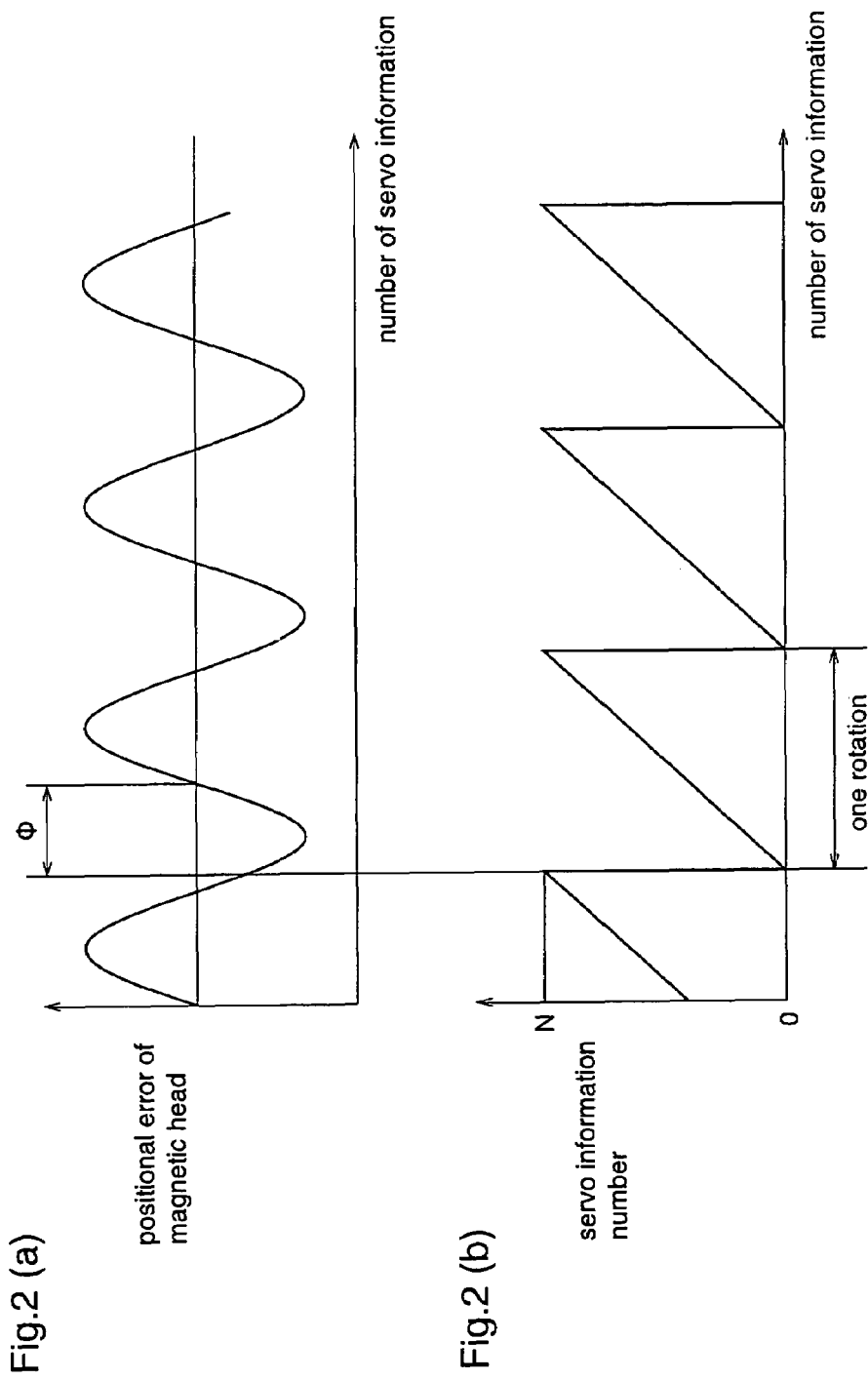
FIG. 2(a) is a waveform diagram illustrating variations in positional error of a magnetic head in the HDD, relative to the number of servo information.
FIG. 2(b) is a waveform diagram illustrating variations in servo information number relative to the number of servo information.
Figure 3:
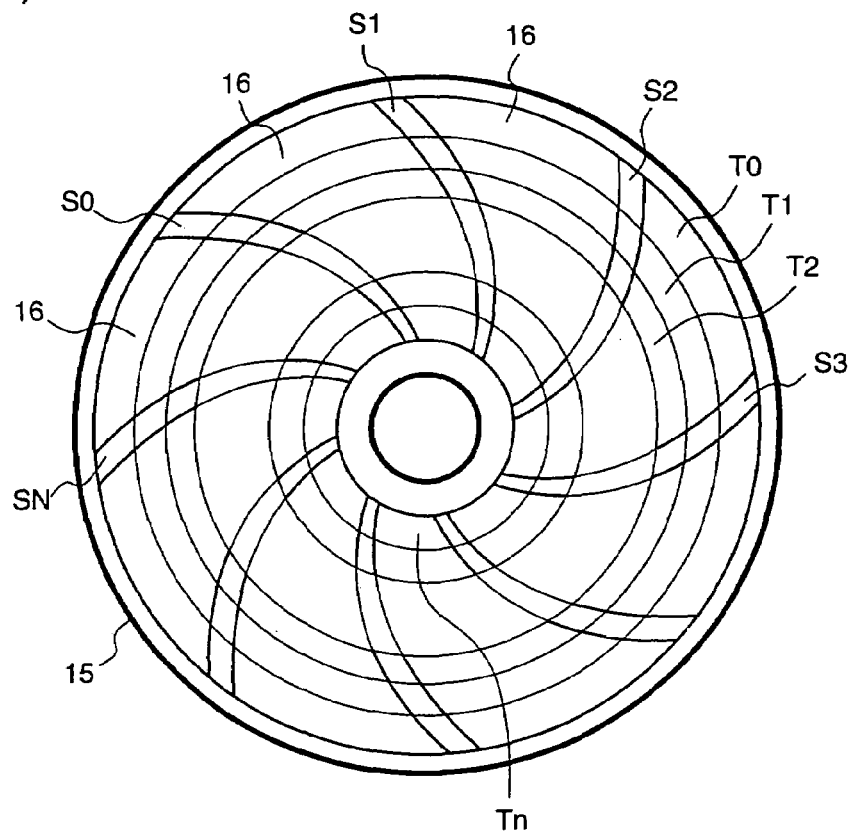
FIG. 3(a) is a plan view illustrating layout of tracks and servo information on a magnetic disk.
FIG. 3(b) is a partial enlarged view of the magnetic disk.
Figure 3:
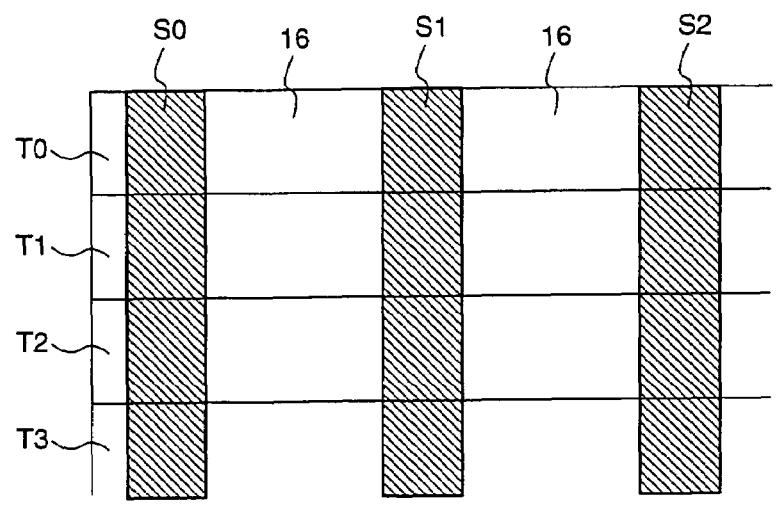

FIG. 2(a) is a waveform diagram illustrating variations in positional error of a magnetic head of an HDD relative to the number of servo information, wherein the abscissa shows the number of servo information while the ordinate shows the positional error of the magnetic head. FIG. 2(b) is a waveform diagram illustrating variations in servo information number with respect to the number of servo information, wherein the abscissa shows the number of servo information and the ordinate shows the servo information number. Further, FIG. 3(a) is a plane view illustrating tracks and servo information arranged on a magnetic disk having concentric tracks T0~Tn and servo information areas S)~SN. FIG. 3(b) is an enlarge view of a portion of the magnetic disk, illustrating concentric tracks T0~Tn and servo information areas S0~SN. In the following description, the tracks T0~Tn are also referred to as track numbers T0~Tn, and the servo information areas S0~SN are also referred to as servo information numbers S0~SN, that is, the same symbol is used for the both meanings. When the magnetic head is located at a predetermined position on a magnetic disk that is eccentrically rotating, plural tracks cross under the magnetic head.

In FIG. 3(a), the track numbers T0, T1, T2, . . . Tn are assigned to the plural concentric tracks on the magnetic disk 15, respectively. The track number T0 is the outermost track number, and the tracks are expressed by adding natural numbers toward the inner side, like the track numbers T1, T2, . . . Tn. When the magnetic disk is eccentric, the track numbers of the tracks traced by the magnetic head that is placed at a predetermined position on the magnetic disk 15 vary in a sinusoidal wave within a fixed range. The cycle of the sinusoidal wave is equal to the rotation cycle of the magnetic disk.

As shown in FIG. 3(a), the respective tracks T0~Tn on the magnetic disk 15 are provided with (N+1) servo information areas S0~SN, wherein servo information has previously been recorded. For example, N is several hundreds. The servo information recorded in the servo information areas S0~SN which are provided in the respective concentric tracks are given natural numbers 0~N, thereby providing servo information numbers S0~SN. Further, FIG. 3(b) is a partial enlarged view of the magnetic disk, illustrating the relationships among the tracks T0~T3 and the servo information areas S0, S1, and S2. Sector data areas 16 are areas for data recording to be used by the user.

The servo information numbers S0~SN which are detected by the magnetic head placed at a predetermined position on the rotating magnetic disk 15 change from 0 to N at every rotation of the magnetic disk 15. When the magnetic disk 15 is continuously rotated, a signal expressing the servo information numbers S0~SN has a sawtooth waveform. The sinusoidal wave shown in FIG. 2(a) and the sawtooth wave shown in FIG. 2(b) have the same cycle. A phase difference between the sinusoidal wave and the sawtooth wave is referred to as "phase error amount Φ".

Figure 1:
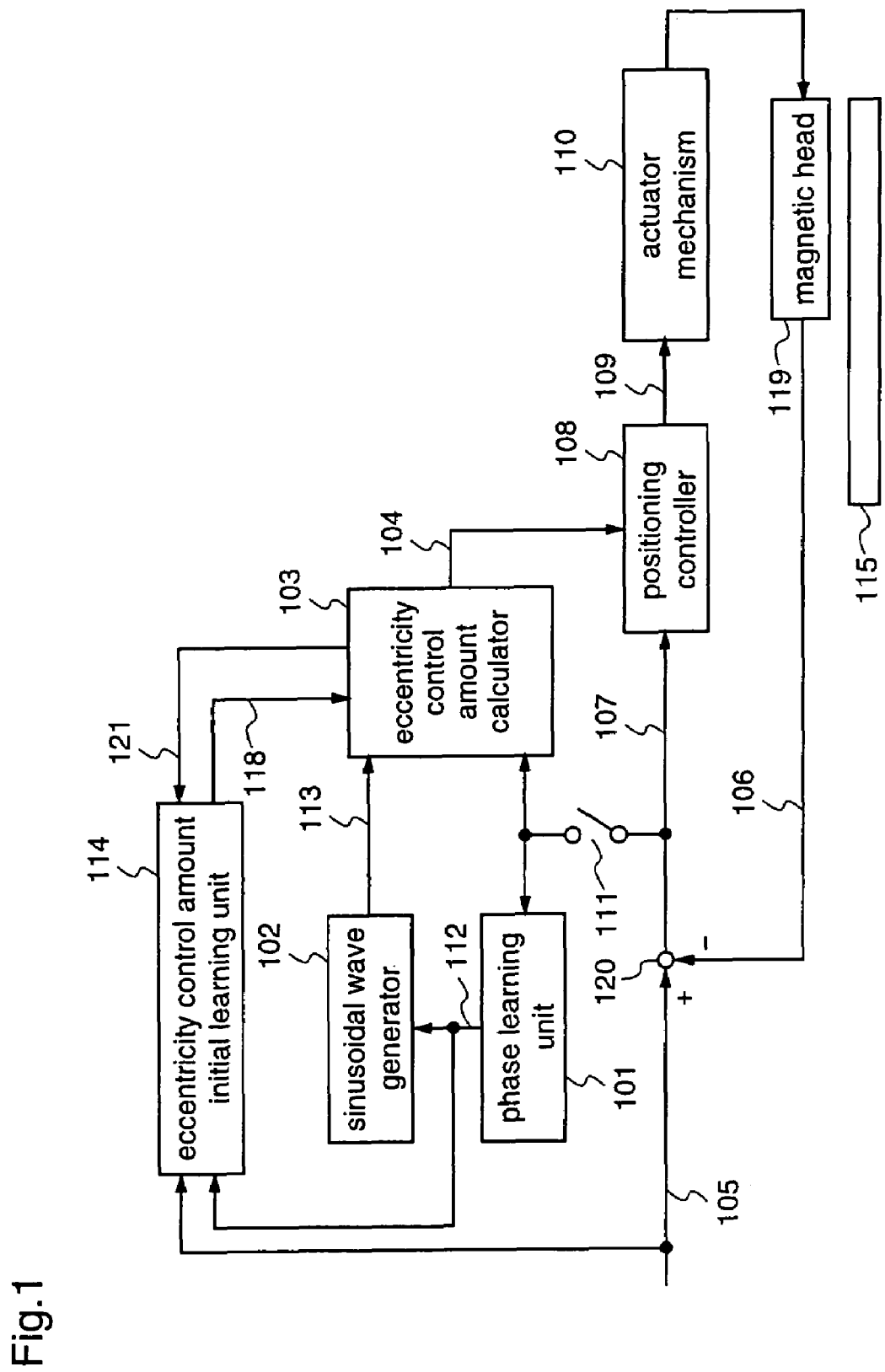
FIG. 1 is a block diagram of an HDD according to a first embodiment of the present invention.

FIG. 1 is a block diagram of an HDD according to the first embodiment of the present invention.

As shown in FIG. 1, the HDD according to the first embodiment is provided with a magnetic head 119 for recording or reproducing information in/from a magnetic disk 115 to output a head position signal 106; an actuator mechanism 110 for driving the magnetic head 119 on the basis of a magnetic head control amount signal 109; a phase learning unit 101 for learning a phase error amount which is a phase difference between the sawtooth wave indicating variations in the servo information number S that is read by the magnetic head 119 and the sinusoidal wave indicating variations in the eccentricity amount of the magnetic disk 115, thereby to output a phase error amount signal 112; a sinusoidal wave generator 102 for outputting an eccentricity sync sinusoidal signal 113 having the phase error amount learned by the phase learning unit 101, at a frequency synchronized with the rotation frequency of the magnetic disk 115; an eccentricity control amount calculator 103 for calculating an eccentricity control amount by multiplying the eccentricity sync sinusoidal signal 113 by a weight factor to output an eccentricity control amount signal 104, and performing learning of eccentricity amount and updation of weight factor to output a weight factor signal 121; a positioning controller 108 for calculating a magnetic head control amount by adding the eccentricity control amount to an ordinary feedback control amount to output a magnetic head control amount signal 109; a subtracter 120 for subtracting the head position signal 106 from an externally inputted target position signal 105 to output a positional error signal 107 as a result of subtraction; a learning switch 111 for selecting whether learning of eccentricity amount and updation of weight factor by the eccentricity control amount calculator 103 should be carried out or not; and an eccentricity control amount initial learning unit 114 for holding phase error amount signals 112 and weight factor signals 121 corresponding to plural areas into which the magnetic disk 115 is concentrically divided.

Hereinafter, the disk eccentricity control method will be described.

Upon start-up of the HDD, the actuator mechanism 110 initially locates the magnetic head 119 at a predetermined position in an outermost-circumference area on the magnetic disk 115 by ordinary feedback control. The ordinary feedback control is a control for making the magnetic head follow a desired track during tracking operation and settling operation, and making the magnetic head follow a desired moving speed during seek operation. The details of the feedback control will be omitted.

The magnetic head 119 detects the position of the magnetic head 119 on the magnetic disk 115 on the basis of the track number detected by the magnetic head 119, and outputs a head position signal 106.

The subtracter 120 subtracts the head position signal 106 from the externally inputted target position signal 105, and outputs a positional error signal 107 as a result of subtraction to the phase learning unit 101 and the eccentricity control amount calculator 103 through the learning switch 111 that is closed at start-up. The positional error signal 107 changes in a sinusoidal waveform when the magnetic disk 115 is eccentric.

The phase learning unit 101 calculates a phase error amount Φ between the sinusoidal wave of the positional error signal 107 and the sawtooth wave indicating variations in the servo information number S, and outputs a phase error amount signal 112 expressing the phase error amount Φ to be applied to the sinusoidal wave generator 102 and the eccentricity control amount initial learning unit 114.

The eccentricity control amount initial learning unit 114 holds the phase error amount signal 112 as the phase error amount Φ in the magnetic disk 115 on which positioning of the magnetic head 119 is carried out.

The sinusoidal wave generator 102 outputs an eccentricity sync sinusoidal signal 113 at a phase according to the phase error amount Φ to the eccentricity control amount calculator 103.

The eccentricity control amount calculator 103 multiplies the eccentricity sync sinusoidal signal 113 by a predetermined weight factor A as shown in formula (1) to calculate an eccentricity control amount ur.

$$ur = A \times \sin(2\pi f \times (k-\Phi) \div N) \quad (1)$$

f: magnetic disk rotation frequency
k: servo information number

The eccentricity control amount signal 104 indicating the eccentricity control amount ur is applied to the positioning controller 108.

The eccentricity control amount calculator 103 performs product-sum operation on the positional error signal 107 and the eccentricity sync sinusoidal signal 113, for each servo information number, as shown in formula (2), thereby to obtain a product-sum value I.

$$I = \Sigma\{Er \times \sin(2\pi f \times (k-\Phi) \div N)\} \quad (2)$$

Er: positional error signal

The product-sum value I is multiplied by a gain G that is a predetermined constant to update the weight factor A for every rotation of the magnetic disk 115 as shown in formula (3).

$$A = A' - G \times I \quad (3)$$

A': weight factor at previous updation

A weight factor signal 121 indicating the weight factor A is applied to the eccentricity control amount initial learning unit 114.

The eccentricity control amount initial learning unit 114 holds the weight factor signal 121 as a weight factor A in an outermost-circumference area on the surface of the magnetic disk 115 on which positioning of the magnetic head 119 is carried out.

The positioning controller 108 calculates a control amount used for performing the ordinary feedback control to make the magnetic head 119 follow a desired track, i.e., a control amount that reduces the positional error signal 107, on the basis of the positional error signal 107, and adds the control amount to the eccentricity control amount signal 104, thereby calculating a magnetic head control amount signal 109. The magnetic head control amount signal 109 is applied to the actuator mechanism 110, whereby positioning of the magnetic head 119 is controlled.

Thereafter, the actuator mechanism 110 locates the magnetic head 119 at a predetermined position in an area which is next to and inner than the outermost area on the magnetic disk 115, by the ordinary feedback control, followed by the above-mentioned operation, thereby calculating a weight factor A in this area to be stored. Likewise, the above-mentioned operation, i.e., positioning of the magnetic head 119, calculation of a weight factor A, and storage of the weight factor A, are carried out with respect to other areas, thereby calculating weight factors A corresponding to the respective areas on the magnetic disk 115, and storing the weight factors A.

Furthermore, during the seek time when the magnetic head 119 accesses the target track, the learning switch 111 is turned off to stop learning and calculation of weight factor A. When the HDD shifts from the seek operation to the settling operation, the eccentricity control amount initial learning unit 114 reads the weight factor A and the phase error amount Φ corresponding to the target position signal 105 indicating the position where the magnetic head 119 should be located, and applies them to the eccentricity control amount calculator 103 as eccentricity information 118.

During the settling operation, the eccentricity control amount calculator 103 multiplies the weight factor A corresponding to the target position by the sinusoidal wave synchronized with the phase error amount Φ, thereby outputting a settling eccentricity control amount signal 104.

When the HDD shifts from the settling operation to the tracking operation, the learning switch 111 is turned on to resume learning and calculation of weight factor A.

As described above, the HDD according to the first embodiment is provided with the eccentricity control amount initial learning means for previously holding the phase error amount learned by the phase learning means, and the weight factor of each of plural areas into which the disk is concentrically divided, and the eccentricity control amount calculator calculates an eccentricity control amount using the phase error amount and the weight factor which correspond to the target position of the head and are stored in the eccentricity control amount initial learning unit, during the settling operation. Therefore, even when the value of the weight factor at the innermost circumference of the disk is different from that at the outermost circumference, the time from when the HDD shifts to the tracking operation and learning and calculation of weight factor A are resumed to when the weight factor converges is shortened, whereby the seek time can be shortened.

When information is read or written from/in the other surface of the magnetic disk, a phase error amount in the magnetic disk and a weight factor A corresponding to each area in each surface are calculated and stored in the eccentricity control amount initial learning unit so as to be used for calculation of a settling eccentricity control amount, whereby the head switch time can be shortened.

Embodiment 2.

Figure 4:
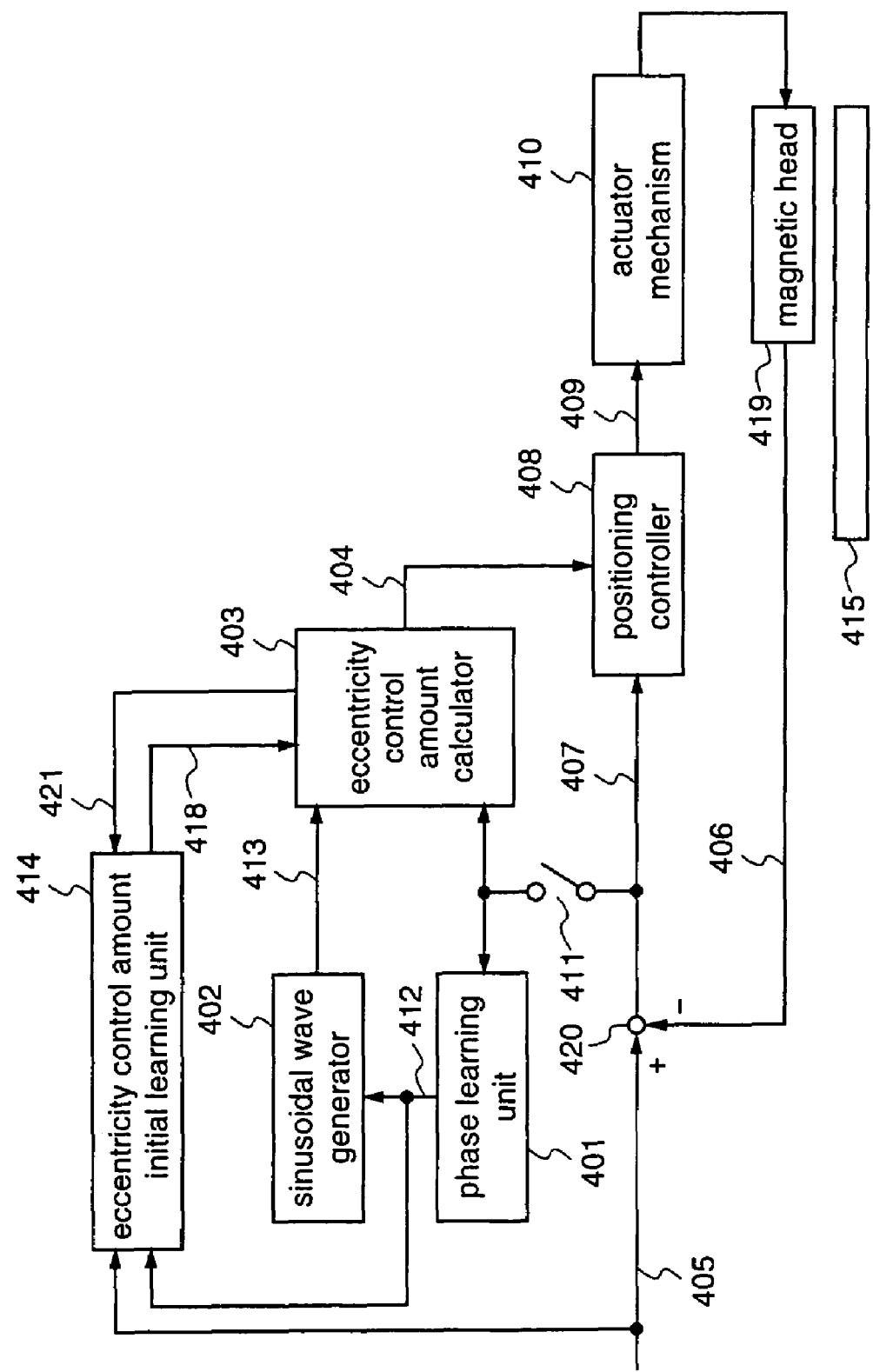
FIG. 4 is a block diagram of an HDD according to a second embodiment of the present invention.

FIG. 4 is a block diagram illustrating an HDD according to a second embodiment of the present invention.

As shown in FIG. 4, the HDD according to the second embodiment is provided with a magnetic head 419 for recording or reproducing information in/from a magnetic disk 415 to output a head position signal 406; an actuator mechanism 410 for driving the magnetic head 419 on the basis of a magnetic head control amount signal 409; a phase learning unit 401 for learning a phase error amount which is a phase difference between a sawtooth wave indicating variations in the servo information number S that is read by the magnetic head 419 and a sinusoidal wave indicating variations in the eccentricity amount of the magnetic disk 115, and outputting a phase error amount signal 412; a sinusoidal wave generator 402 for outputting an eccentricity sync sinusoidal signal 413 having the phase error amount that is learned by the phase learning unit 401, at a frequency synchronized with the rotation frequency of the magnetic disk 415; an eccentricity control amount calculator 403 for calculating an eccentricity control amount by multiplying the eccentricity sync sinusoidal signal 413 by a weight factor to output an eccentricity control amount signal 404, and performing learning of the eccentricity amount and updation of the weight factor to output a weight factor signal 421; a positioning controller 408 for calculating a magnetic head control amount by adding the eccentricity control amount and an ordinary feedback control amount, and outputting a magnetic head control amount signal 409; a subtracter 420 for subtracting the head position signal 406 from an externally inputted target position signal 405 to output a positional error signal 407 as a result of subtraction; a learning switch 411 for selecting whether learning of eccentricity amount and updation of weight factor by the eccentricity control amount calculator 103 should be carried out or not; and an eccentricity control amount initial learning unit 414 for holding the phase error amount signal 412 and the weight factor signal 421 corresponding to each of plural areas into which the magnetic disk 415 is concentrically divided, obtaining a linear expression indicating the relationship between the weight factor and the position where the magnetic head should be located, and holding the inclination and intercept thereof.

Hereinafter, the disk eccentricity control method will be described.

Upon start-up of the HDD, the actuator mechanism 410 initially locates the magnetic head 419 at a predetermined position in an outermost circumference area of the magnetic disk 415 by performing ordinary feedback control. The ordinary feedback control is carried out so that the magnetic head follows a desired track during tracking and settling, and follows a desired moving speed during seeking. The details of the feedback control will be omitted.

The magnetic head 419 detects the position of the magnetic head 419 on the magnetic disk 415 on the basis of the track number detected by the magnetic head 419, and outputs a head position signal 406.

The subtracter 420 subtracts the head position signal 406 from the externally inputted target position signal 405, and outputs a positional error signal 407 as a result of subtraction to the phase learning unit 401 and the eccentricity control amount calculator 403 through the learning switch 411 that is closed at start-up.

The phase learning unit 401 calculates a phase error amount Φ between the sinusoidal wave of the phase error signal 407 and the sawtooth wave indicating variations in the servo information number S and outputs a phase error amount signal 412 indicating the phase error amount Φ to the sinusoidal wave generator 402 and the eccentricity control amount initial learning unit 414.

The eccentricity control amount initial learning unit 414 holds the phase error amount signal 412 as a phase error amount Φ in the magnetic disk 415 on which positioning of the magnetic head 419 is performed.

The sinusoidal wave generator 402 outputs the eccentricity sync sinusoidal signal 413 at a phase according to the phase error amount Φ to the eccentricity control amount calculator 403.

The eccentricity control amount calculator 403 multiplies the eccentricity sync sinusoidal signal 413 by a weight factor A to obtain an eccentricity control amount ur, and outputs an eccentricity control amount signal 404 expressing the eccentricity control amount ur to the positioning controller 408.

The eccentricity control amount calculator 403 performs product-sum operation, for each servo information number, on the positional error signal 407 and the eccentricity sync sinusoidal signal 413 to obtain a product-sum value I. The product-sum value I is multiplied by a gain G for every rotation of the magnetic disk 415 to update the weight factor A.

A weight factor signal 421 indicating the weight factor A is applied to the eccentricity control amount initial learning unit 414, and the eccentricity control amount initial learning unit 414 holds the weight factor signal 421.

The positioning controller 408 calculates a control amount for performing the ordinary feedback control to make the magnetic head 419 follow a desired track, i.e., a control amount to reduce the positional error signal 407, on the basis of the positional error signal 407, and adds the control amount to the eccentricity control amount signal 404, thereby obtaining a magnetic head control amount signal 409. The magnetic head control amount signal 409 is applied to the actuator mechanism 410, whereby positioning of the magnetic head 419 is controlled.

Thereafter, the actuator mechanism 410 locates the magnetic head 419 at a predetermined position in an area that is next to and inner than the outermost area on the magnetic disk 415 by the ordinary feedback control, followed by the above-mentioned operation, thereby calculating a weight factor A in this area to be stored. Likewise, the above-mentioned operation, i.e., positioning of the magnetic head 419, calculation of a weight factor A, and storage of the weight factor A, are carried out for other areas, thereby calculating and storing weight factors A corresponding to the respective areas on the magnetic disk 415.

The eccentricity control amount initial learning unit 414 obtains a linear expression indicating the relationship between the weight factor in each area and the position where the magnetic head should be located, by using the weight factor which is measured at a predetermined position in each area and then stored, and the weight factor which is measured at a predetermined position in an area next to and inner than the area and then stored, and holds the inclination and intercept of the linear expression corresponding to each area. That is, in order to obtain a linear expression indicating the relationship between the weight factor and the position where the magnetic head should be positioned in the outermost circumference area, the inclination and intercept thereof are calculated from a weight factor that is measured at a predetermined position in the outermost circumference area and then stored, and a weight factor that is measured at a predetermined position in an area next to and inner than the outermost area, and the inclination and intercept are stored as a linear expression indicating the relationship between the weight factor and the position where the magnetic head is to be located, in the outermost circumference area.

Further, during the seek time when the magnetic head 419 accesses the target track, the learning switch 411 is turned off to stop learning and calculation of weight factor A. When the HDD shifts from the seek operation to the settling operation, the eccentricity control amount initial learning unit 414 reads the phase error amount Φ corresponding to the target position signal 405 indicating the position where the magnetic head 419 should be located, and reads the inclination and intercept of the linear expression which indicates the relationship between the weight factor and the position where the magnetic head should be positioned, corresponding to the target position signal 405, and calculates a weight factor corresponding to the target position signal 405 and applies the weight factor as eccentricity information 418 to the eccentricity control amount calculator 403.

During the settling operation, the eccentricity control amount calculator 403 multiplies the weight factor A corresponding to the target position by the sinusoidal wave synchronized with the phase error amount Φ, thereby to output a settling eccentricity control amount signal 404.

When the HDD shifts from the settling operation to the tracking operation, the learning switch 411 is turned on to resume learning and calculation of weight factor A.

As described above, the HDD according to the second embodiment is provided with the eccentricity control amount initial learning means for previously holding the phase error amount that is learned by the phase learning means, and the approximate expression that expresses the relationship between the weight factor of each of plural areas into which the disk is concentrically divided and the target position of the head. During the settling operation, the eccentricity control amount calculator calculates an eccentricity control amount using the phase error amount and the weight factor calculated from the approximate expression, which are stored in the eccentricity control amount initial learning unit. Therefore, even when the value of the weight factor significantly varies among the areas into which the magnetic disk is concentrically divided, the time from when the HDD shifts to the tracking operation and learning and calculation of weight factor A is resumed to when the weight factor converges is shortened, whereby the seek time is shortened.

Embodiment 3.

Figure 5:
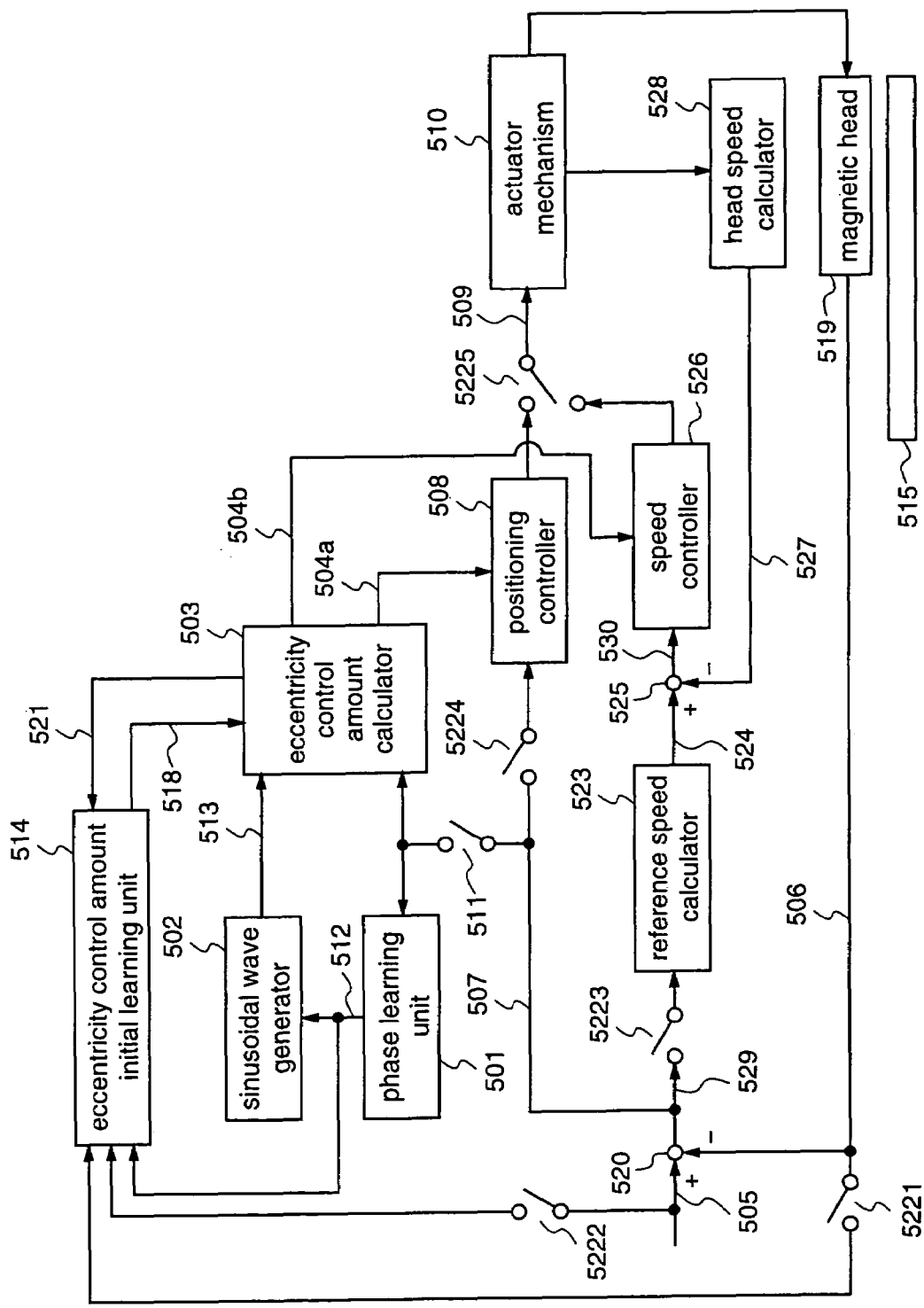
FIG. 5 is a block diagram of an HDD according to a third embodiment of the present invention.

FIG. 5 is a block diagram of an HDD according to a third embodiment of the present invention.

As shown in FIG. 5, the HDD according to the third embodiment is provided with a magnetic head 519 for recording or reproducing information on/from a magnetic disk 515 to output a head position signal 506; an actuator mechanism 510 for operating the magnetic head 519 on the basis of a magnetic head control amount signal 509; a phase learning unit 501 for learning an amount of phase shift which is a phase difference between a sawtooth wave indicating variations in servo information number S that is read by the magnetic head 519 and a sinusoidal wave indicating variations in the eccentricity amount of the magnetic disk 515, and outputting a phase shift amount signal 512; a sinusoidal wave generator 502 for outputting an eccentricity sync sinusoidal signal 513 having the phase shift amount that is learned by the phase learning unit 501, at a frequency synchronized with the rotation frequency of the magnetic disk 515; an eccentricity control amount calculator 503 for calculating an eccentricity control amount by multiplying the eccentricity sync sinusoidal signal 513 by a weight factor to output an eccentricity control amount signal 504, and performing learning of the eccentricity amount and updation of the weight factor to output a weight factor signal 521; a positioning controller 508 for calculating a magnetic head control amount by adding the eccentricity control amount and an ordinary feedback control amount, and outputting a magnetic head control signal 509; a subtracter 520 for subtracting the head position signal 506 from a target position signal 505 that is externally supplied, and outputting a positional error signal 507 and a remaining distance signal 529 as a result of subtraction; a learning switch 511 for selecting whether learning of eccentricity amount and updation of weight factor should be carried out or not; an eccentricity control amount initial learning unit 514 for holding a phase shift amount signal 512 and a weight factor signal 521 corresponding to each of plural areas into which the magnetic disk 515 is concentrically divided; a head speed calculation unit 528 for calculating the actual moving speed of the magnetic head 519 on the basis of the output of the actuator mechanism 510; a reference speed calculation unit 523 for outputting a target speed signal 524 according to the remaining distance signal 529; a subtracter 525 for subtracting a head speed signal 527 outputted from the head speed calculation unit 528 from the target speed signal 524 to output a speed error signal 530; a speed controller 526 for calculating a magnetic head control amount by adding the eccentricity control amount and the ordinary feedback control amount, thereby to output a magnetic head control amount signal 509; and switches 5221, 5222, 5223, 5224, and 5225 for switching the feedback control system in conjunction with each other so that the magnetic head control amount signal 509 outputted from the positioning controller 508 is input to the actuator mechanism 510 during the tracking operation and the settling operation, and the magnetic head control amount signal 509 outputted from the speed controller 526 is input to the actuator mechanism 510 during the seek operation.

Hereinafter, the disk eccentricity control method will be described.

Upon start-up of the HDD, the switches 5221 and 5223 are turned off, the switches 5222 and 5224 are turned on, and the switch 5225 is connected to the positioning controller 508. The actuator mechanism 510 locates the magnetic head 519 at a predetermined position in an outermost circumference area on the magnetic disk 515 by ordinary feedback control. The ordinary feedback control is performed so that the magnetic head follows a desired track during tracking and settling, and follows a desired moving speed during seeking. The details of the feedback control will be omitted.

The magnetic head 119 detects the position of the magnetic head 519 on the magnetic disk 515 on the basis of the track number detected by the magnetic head 519, and outputs a head position signal 506.

The subtracter 520 subtracts the head position signal 506 from the externally inputted target position signal 505 to output a positional error signal 507 and a remaining distance signal 529 as the results of subtraction. The positional error signal 507 is applied to the phase learning unit 501 and the eccentricity control amount calculator 503 through the learning switch 511 that is closed at start-up.

The phase learning unit 501 calculates a phase error amount Φ between the sinusoidal wave of the phase error signal 507 and the sawtooth wave indicating a change in the servo information number S, and applies a phase error amount signal 512 indicating the phase error amount Φ to the sinusoidal wave generator 502 and the eccentricity control amount initial learning unit 514.

The eccentricity control amount initial learning unit 514 holds the phase error amount signal 512 as the phase error amount Φ obtained in the magnetic disk 515 on which the magnetic head 519 performs positioning.

The sinusoidal wave generator 502 outputs an eccentricity sync sinusoidal signal 513 at a phase according to the phase error amount Φ to the eccentricity control amount calculator 503.

The eccentricity control amount calculator 503 multiplies the eccentricity sync sinusoidal wave signal 513 by a weight factor A to obtain an eccentricity control amount ur, and outputs an-eccentricity control amount signal 504 indicating the eccentricity control amount ur to the positioning controller 508.

The eccentricity control amount calculator 503 performs product-sum operation on the phase error signal 507 and the eccentricity sync sinusoidal wave signal 513 for every servo information number to obtain a product-sum value I. Then, the calculator 503 multiplies the product-sum value I by a gain G for every rotation of the magnetic disk 515, thereby updating the weight factor A.

A weight factor signal 521 indicating the weight factor A is applied to the eccentricity control amount initial learning unit 514. The eccentricity control amount initial learning unit 114 holds the weight factor signal 521 as the weight factor A in an area at the outermost circumference on the surface of the magnetic disk 515 on which the magnetic head 519 performs positioning.

The positioning controller 508 calculates a control amount to be used when performing the ordinary feedback control to make the magnetic head 519 follow a desired track, i.e., a control amount with which the positional error signal 507 is reduced, on the basis of the positional error signal 507, and adds the control amount to the eccentricity control amount signal 504a, thereby calculating a magnetic head control amount signal 509. The magnetic head control amount signal 509 is applied to the actuator mechanism 510, whereby positioning control for the magnetic head 519 is carried out.

Thereafter, the actuator mechanism 510 locates the magnetic head 519 at a predetermined position in an area next to and inner than the outermost area on the magnetic disk 515, by the ordinary feedback control, followed by the above-mentioned operation, thereby calculating a weight factor A in this area. Likewise, the above-mentioned operation, i.e., positioning of the magnetic head 519, calculation of a weight factor A, and storage of the weight factor A, are carried out for other areas, thereby calculating and storing weight factors A corresponding to the respective areas on the magnetic disk 115.

Furthermore, during the seek time when the magnetic head 519 accesses the target track, the learning switch 511 is turned off to stop learning and calculation of weight factor A. At this time, the switches 5221 and 5223 are turned on, the switches 5222 and 5224 are turned off, and the switch 5225 is placed at the speed controller 526 side, respectively.

During the seek operation, the remaining distance signal 529 outputted from the subtracter 520 is applied to the reference speed calculator 523 through the switch 5223 that is closed during the seek operation. The reference speed calculator 523 outputs a target speed signal 524 according to the remaining distance signal 529. Further, the head speed calculator 528 calculates the moving speed of the magnetic head 519 on the basis of the output of the actuator mechanism 510.

The subtracter 525 subtracts the head speed signal 527 outputted from the head speed calculator 528 from the target speed signal 524, thereby calculating a speed error signal 530.

On the other hand, the eccentricity control amount initial learning unit 514 reads, during the seek operation, the weight factor A and the phase error amount Φ corresponding to the head position signal 506 indicating the position of the magnetic head 519 on the magnetic disk 515, and applies them as eccentricity information 518 to the eccentricity control amount calculator 503. The eccentricity control amount calculator 503 multiplies the weight factor A corresponding to the current position of the magnetic head 519 by the sinusoidal wave synchronized with the phase error amount Φ, thereby to output a seek eccentricity control amount signal 504b.

The speed controller 526 calculates a control amount to be used for performing the ordinary feedback control to make the magnetic head 519 follow a desired moving speed, i.e., a control amount that reduces the speed error signal 530, on the basis of the speed error signal 530, and adds the control amount to the seek eccentricity control amount signal 504b outputted from the eccentricity control amount calculator 503, thereby to calculate a magnetic head control amount signal 509. The magnetic head control amount signal 509 is applied to the actuator mechanism 510, whereby the magnetic head 519 is controlled.

When the HDD shifts from the seek operation to the settling operation, the switches 5221 and 5223 are turned off, the switches 5222 and 5224 are turned on, and the switch 5225 is placed at the positioning controller 508 side. The eccentricity control amount initial learning unit 514 reads the phase error amount Φ and the weight factor A corresponding to the target position signal 505 indicating the desired position of the magnetic head 519, and applies them as eccentricity information 518 to the eccentricity control amount calculator 503.

During the settling operation, the eccentricity control amount calculator 503 multiplies the weight factor A corresponding to the target position by the sinusoidal wave synchronized with the phase error amount Φ, thereby to output a settling eccentricity control amount signal 504a.

When the HDD shifts from the settling operation to the tracking operation, the learning switch 511 is turned on to resume learning and calculation of weight factor A.

As described above, the HDD according to the third embodiment is provided with the speed control-means which performs, during the seek operation, head position control by using the speed error of the head outputted from the subtracter, and the eccentricity control amount that is calculated using the phase error amount and the weight factor corresponding to the current position of the head that is stored in the eccentricity control amount initial learning unit by the eccentricity control amount calculator. Therefore, the position of the magnetic head can be accurately detected, resulting in stable seek operation.

Embodiment 4.

Figure 6:
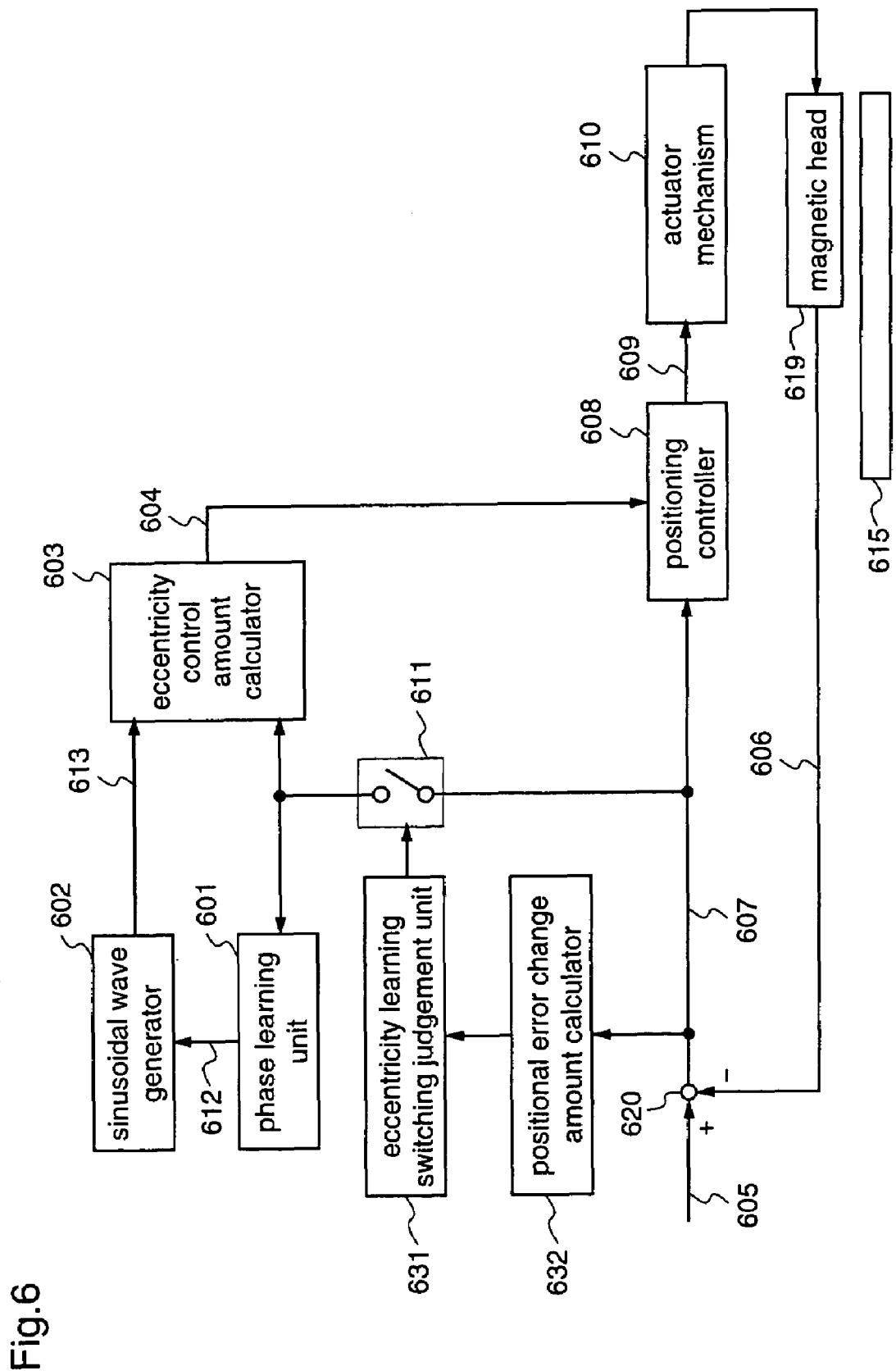
FIG. 6 is a block diagram of an HDD according to a fourth embodiment of the present invention.

FIG. 6 is a block diagram illustrating an HDD according to a fourth embodiment of the present invention.

With reference to FIG. 6, the HDD according to the fourth embodiment of the invention is provided with a magnetic head 619 for performing recording and playback of information in/from a magnetic disk 615 to output a head position signal 606; an actuator mechanism 610 for driving the magnetic head 619 on the basis of the magnetic head control amount signal 609; a phase learning unit 601 for learning a phase error amount which is a phase difference between a sawtooth wave indicating variations in servo information number S that is read by the magnetic head 619 and a sinusoidal wave indicating variations in the eccentricity amount of the magnetic disk 615, thereby to output a phase error amount signal 612; a sinusoidal wave generator 602 for outputting an eccentricity sync sinusoidal signal 613 having the phase error amount that is learned by the phase learning unit 601, at a frequency synchronized with the rotation frequency of the magnetic disk 615; an eccentricity control amount calculator 603 for calculating the eccentricity control amount by multiplying the eccentricity sync sinusoidal signal 613 by a weight factor to output an eccentricity control amount signal 604, and performing learning of the eccentricity amount and updation of the weight factor; a positioning controller 608 for calculating the magnetic head control amount by adding the eccentricity control amount and the ordinary feedback control amount to output a magnetic head control amount signal 609; a subtracter 620 for subtracting the head position signal 606 from an externally inputted target position signal 605 to output a positional error signal 607 as a result of subtraction; a learning switch 611 for selecting whether learning of the eccentricity amount and updation of the weight factor by the eccentricity control amount calculator 603 should be carried out or not; a positional error change amount calculator 632 for calculating an amount of change of the positional error signal on the basis of the positional error signal 607; and an eccentricity learning switching judgement unit 631 for turning off the learning switch 611 when the amount of change of the positional error signal 607 exceeds a predetermined value.

Hereinafter, the disk eccentricity control method will be described.

The phase learning unit 601 calculates a phase error amount Φ between the sinusoidal wave of the phase error signal 607 and the sawtooth wave indicating variations in the servo information number S, and outputs a phase error amount signal 612 indicating the phase error amount Φ to the sinusoidal wave generator 602.

The sinusoidal wave generator 602 to which the phase error amount signal 612 is applied generates an eccentricity sync sinusoidal wave signal 613 at a phase according to the phase error amount Φ, and applies it to the eccentricity control amount calculator 603.

The eccentricity control amount calculator 603 multiplies the applied eccentricity sync sinusoidal signal 613 by a weight factor A to obtain an eccentricity control amount ur, and outputs an eccentricity control amount signal 604 indicating the eccentricity control amount ur to the positioning controller 608. Further, the eccentricity control amount calculator 603 performs product-sum operation on the positional error signal 607 and the eccentricity sync sinusoidal signal 613 for each servo information number, thereby to obtain a product-sum value I. The product-sum value I is multiplied by a gain G for every rotation of the magnetic disk 615 to update the weight factor A.

The positioning controller 608 calculates a control amount for performing the ordinary feedback control to make the magnetic head 619 follow a desired track, on the basis of the positional error signal 607, and adds the control amount to the eccentricity control amount signal 604, thereby obtaining a magnetic head control amount signal 609. The magnetic head control amount signal 609 is applied to the actuator mechanism 610, whereby positioning of the magnetic head 619 is carried out.

The positional error change amount calculator 632 calculates an amount of change in the positional error signal on the basis of the positional error signal 607, and outputs it to the eccentricity learning switching judgement unit 631.

The eccentricity learning switching judgement unit 631 turns off the learning switch 611 when the amount of change of the positional error signal outputted from the positional error change amount calculator 632 exceeds a predetermined value, thereby to stop learning and calculation of weight factor A.

Since the weight factor A is not updated while learning and calculation of weight factor A are stopped, the eccentricity control amount calculator 603 calculates the eccentricity control amount using the weight factor which has been obtained just before the turn-off of the learning switch 611.

Then, the eccentricity learning switching judgement unit 631 turns on the learning switch 611 when the amount of change in the positional error signal 607 is recovered to a value equal to or smaller than the predetermined value and the positional error signal 607 is within a predetermined range, thereby to resume learning and calculation of weight factor A.

As described above, the HDD according to the fourth embodiment is provided with the eccentricity learning switching judgement unit for calculating an amount of change in the positional error signal on the basis of the positional error signal, and stops learning of eccentricity amount and updation of weight factor when the amount of change in the positional error signal calculated by the eccentricity learning switching judgement unit exceeds a predetermined value. Therefore, even when the magnetic head is moved by an impact or the like, positioning of the magnetic head can be carried out with stability.

Embodiment 5.

Figure 7:
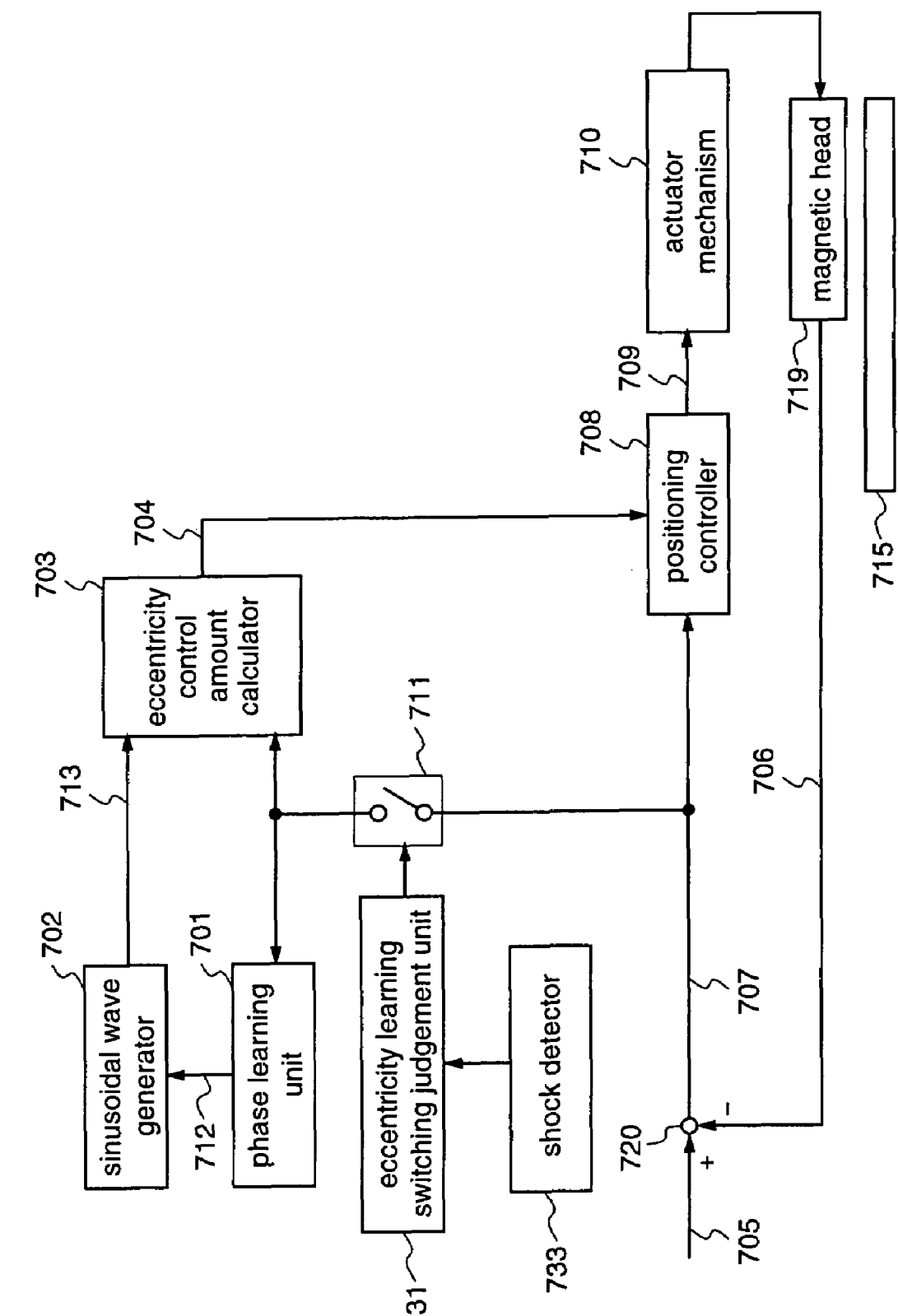
FIG. 7 is a block diagram of an HDD according to a fifth embodiment of the present invention.
Figure 8:
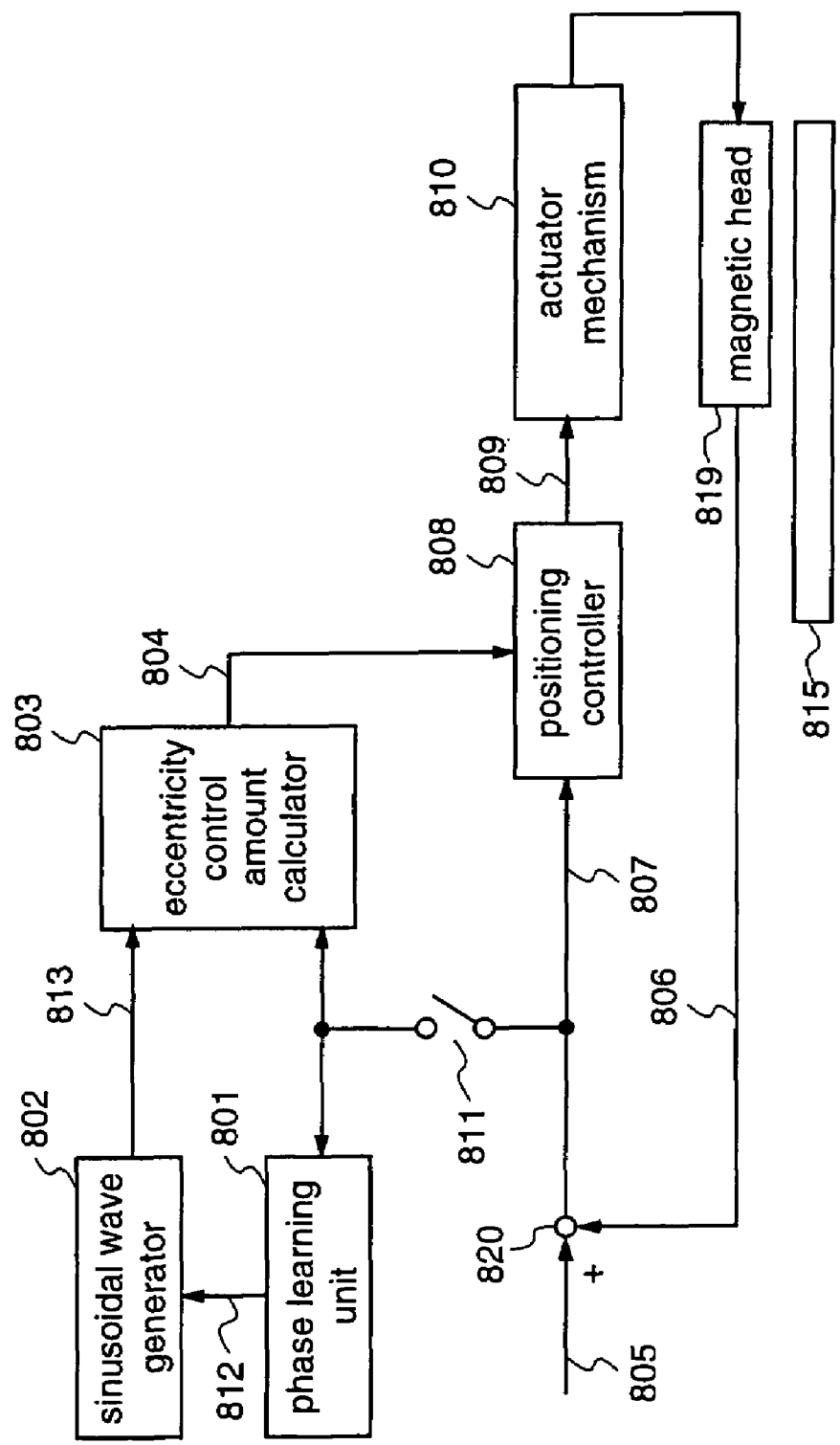
FIG. 8 is a block diagram illustrating a conventional HDD.

FIG. 7 is a block diagram illustrating an HDD according to a fifth embodiment of the present invention.

With reference to FIG. 7, the HDD according to the fifth embodiment is provided with a magnetic head 719 for performing recording or reproduction of information in/from a magnetic disk 715 to output a head position signal 706; an actuator mechanism 710 for driving the magnetic head 719 on the basis of the magnetic head control amount signal 709; a phase learning unit 701 for learning a phase error amount which is a phase difference between a sawtooth wave indicating variations in the servo information number S that is read by the magnetic head 719 and a sinusoidal wave indicating variations in the eccentricity amount of the magnetic disk 715 to output a phase error amount signal 712; a sinusoidal wave generator 702 for outputting an eccentricity sync sinusoidal signal 713 having the phase error amount that is learned by the phase learning unit 701, at a frequency synchronized with the rotation frequency of the magnetic disk 715; an eccentricity control amount calculator 703 for calculating the eccentricity control amount by multiplying the eccentricity sync sinusoidal signal 713 by a weight factor to output an eccentricity control amount signal 704, and performing learning of the eccentricity amount and updation of the weight factor; a positioning controller 708 for calculating the magnetic head control amount by adding the eccentricity control amount and the ordinary feedback control amount to output a magnetic head control amount signal 709; a subtracter 720 for subtracting the head position signal 706 from an externally inputted target position signal 705 to output a positional error signal 707 as a result of subtraction; a learning switch 711 for selecting as to whether learning of eccentricity amount and updation of weight factor by the eccentricity control amount calculator 703 should be carried out or not; an eccentricity learning switching judgement unit 731 for outputting a voltage according to an impact applied to the HDD; and an impact detector 733 for turning off the learning switch 711 when the voltage outputted from the impact detector 733 exceeds a predetermined value.

Hereinafter, the disk eccentricity control method will be described.

The phase learning unit 701 calculates a phase error amount Φ between the sinusoidal wave of the phase error signal 707 and the sawtooth wave indicating variations in the servo information number S, and outputs a phase error amount signal 712 indicating the phase error amount Φ to the sinusoidal wave generator 702.

The sinusoidal wave generator 702 generates an eccentricity sync sinusoidal wave signal 713 at a phase according to the phase error amount Φ, and applies it to the eccentricity control amount calculator 703.

The eccentricity control amount calculator 703 multiplies the eccentricity sync sinusoidal signal 713 by a weight factor A to obtain an eccentricity control amount ur, and outputs an eccentricity control amount signal 704 indicating the eccentricity control amount ur to the positioning controller 708. Further, the eccentricity control amount calculator 703 performs product-sum operation on the positional error signal 707 and the eccentricity sync sinusoidal signal 713 for each servo information number, thereby to obtain a product-sum value I. The product-sum value I is multiplied by a gain G for every rotation of the magnetic disk 715 to update the weight factor A.

The positioning controller 708 calculates a control amount for performing the ordinary feedback control to make the magnetic head 719 follow a desired track, on the basis of the positional error signal 707, and adds the control amount to the eccentricity control amount signal 704, thereby obtaining a magnetic head control amount signal 709. The magnetic head control amount signal 709 is applied to the actuator mechanism 710, whereby positioning of the magnetic head 719 is carried out.

The impact detector 733 outputs a voltage according to an impact applied to the HDD, and outputs the voltage to the eccentricity learning switching judgement unit 731.

The eccentricity learning switching judgement unit 731 turns off the learning switch 711 when the voltage outputted from the impact detector 733 exceeds a predetermined value, thereby to stop learning and calculation of weight factor A.

Since the weight factor A is not updated while learning and calculation of weight factor A are stopped, the eccentricity control amount calculator 703 calculates the eccentricity control amount using the weight factor which has been obtained just before the turn-off of the learning switch 711.

The eccentricity learning switching judgement unit 731 turns on the learning switch 711 when the voltage outputted from the impact detector 733 is recovered to a value equal to or smaller than the predetermined value and the positional error signal 707 is within a predetermined range, thereby to resume learning and calculation of weight factor A.

As described above, the HDD according to the fifth embodiment is provided with the impact detector for outputting a voltage according to an impact applied to the HDD, and stops learning of eccentricity amount and updation of weight factor when the voltage outputted from the impact detector exceeds a predetermined value. Therefore, even when the magnetic head is moved by an impact or the like, positioning of the magnetic head can be carried out with stability.

While in the first to fifth embodiments an eccentricity sync sinusoidal wave is used for calculating a weight factor, a cosine wave may be used.

Further, since the disk eccentricity control methods described with respect to the first to fifth embodiments can be implemented by computer programs, it impossible to record the disk eccentricity control methods according to the present invention on computer-controllable recording media. The recording media include a flexible disk, a CD-ROM, a DVD, a magneto-optical disk, a removable hard disk, a data recording apparatus including a flash memory, and the like.

APPLICABILITY IN INDUSTRY

As described above, a disk device, a disk eccentricity control method, and a recording medium according to the present invention are applicable to any disk device such as an HDD, and are suitable for shortening seek time and stabilizing head positioning.

The invention claimed is:

1. A disk device comprising:
   a head for reading a plurality of servo information which have a series of servo information numbers and are recorded on a disk;
   a phase learning means for learning a phase error amount which is a phase difference between a sawtooth waveform indicating variations in the servo information number that is read by the head and a sinusoidal wave indicating variations in the amount of eccentricity of the disk;

a subtraction means for detecting a positional error of the head on the basis of a target position of the head that is supplied from the outside, and the current position of the head;

a sinusoidal wave generation means for generating an eccentricity sync sinusoidal wave having the phase error amount learned by the phase learning means, at a frequency synchronized with a rotation frequency of the disk;

an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount;

a positioning control means for controlling positioning of the head on the basis of the positional error of the head and the eccentricity control amount; and an eccentricity control amount initial learning means for previously storing the phase error amount learned by the phase learning means, and a weight factor of each of plural areas into which the disk is concentrically divided;

wherein, during a settling operation, said eccentricity control amount calculation means reads a phase error amount and a weight factor corresponding to the target position of the head from the eccentricity control amount initial learning means, and calculates an eccentricity control amount using the phase error amount and the weight factor which have been read out.

2. A disk device as defined in claim 1 wherein said eccentricity control amount initial learning means previously stores an approximate expression that expresses the relationship between a weight factor of each of the plural areas into which the disk is concentrically divided, and the target position of the head, instead of the phase error amount learned by the phase learning means and the weight factor; and during the settling operation, said eccentricity control amount calculation means reads the phase error amount and the approximate expression corresponding to the target position of the head from the eccentricity control amount initial learning means, and calculates a weight factor corresponding to the target position of the head from the read approximate expression, and further, calculates an eccentricity control amount using the calculated weight factor and the read phase error amount.

3. A disk device as defined in claim 1 further including:

a plurality of heads for reading a plurality of servo information which have a series of servo information numbers and are recorded on a plurality of disk surfaces, said heads being provided for the respective disk surfaces;

wherein said eccentricity control amount initial learning means previously stores the phase error amount learned by the phase learning means, and a weight factor of each of the plural areas into which the disk is concentrically divided on each of the disk surfaces read by the respective heads; and during a head switching operation, said eccentricity control amount calculation means reads a phase error amount and a weight factor corresponding to the target position of the head after head switching, from the eccentricity control amount initial learning means, and calculates an eccentricity control amount using the phase error amount and the weight factor which have been read out.

4. A disk device as defined in claim 1 further including:

a plurality of heads for reading a plurality of servo information which have a series of servo information numbers and are recorded on a plurality of disks, respectively;

wherein said eccentricity control amount initial learning means previously stores the phase error amount learned by the phase error means, and a weight factor of each of the plural areas into which each disk is concentrically divided; and during a head switching operation to a head on a different disk, said eccentricity control amount calculation means reads a phase error amount and a weight factor corresponding to the target position of the head after the head switching, from the eccentricity control amount initial learning means, and calculates an eccentricity control amount using the phase error amount and the weight factor which have been read out.

5. A disk device comprising:

a head for reading a plurality of servo information which have a series of servo information numbers and are recorded on a disk;

a phase learning means for learning a phase error amount which is a phase difference between a sawtooth waveform indicating a change in the servo information number read by the head and a sinusoidal wave indicating a change in an amount of eccentricity of the disk;

a first subtraction means for calculating an positional error and a remaining distance of the head, on the basis of a target position of the head that is supplied from the outside, and the current position of the head;

a sinusoidal wave generation means for generating an eccentricity sync sinusoidal wave having the phase error amount learned by the phase learning means, at a frequency synchronized with the rotation frequency of the disk;

an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount;

a positioning control means for controlling positioning of the head on the basis of the positional error of the head and the eccentricity control amount, during settling operation and tracking operation;

an eccentricity control amount initial learning means for previously storing the phase error amount learned by the phase learning means, and a weight factor of each of plural areas into which the disk is concentrically divided;

a reference speed calculation means for calculating a target speed according to the remaining distance of the head;

a head speed calculation means for calculating an actual moving speed of the head;

a second subtraction means for calculating a speed error of the head on the basis of the actual moving speed of the head and the target speed; and a speed control means for controlling, during seek operation, positioning of the head by using the speed error of the head that is calculated by the second subtraction means, and an eccentricity control amount that is calculated by the eccentricity control amount calculation means using a phase error amount and a weight factor corresponding to the current position of the head, which are stored in the eccentricity control amount initial learning means.

6. A disk device comprising:
a head for reading a plurality of servo information which have a series of servo information numbers and are recorded on a disk;
a phase learning means for learning a phase error amount which is a phase difference between a sawtooth waveform indicating variations in the servo information number read by the head and a sinusoidal wave indicating variations in the amount of eccentricity of the disk;
a subtraction means for detecting a positional error of the head on the basis of a target position of the head that is supplied from the outside, and the current position of the head;
a sinusoidal wave generation means for generating an eccentricity sync sinusoidal wave having the phase error amount learned by the phase learning means, at a frequency synchronized with the rotation frequency of the disk;
an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount;
a positioning control means for controlling positioning of the head on the basis of the positional error of the head and the eccentricity control amount;
a positional error change amount calculation means for calculating an amount of change in the positional error of the head; and
an eccentricity learning switching judgement means for making the eccentricity control amount calculation means stop calculation of weight factor when the amount of change calculated by the positional error change amount calculation means exceeds a predetermined value.

7. A disk device comprising:
a head for reading a plurality of servo information which have a series of servo information numbers and are recorded on a disk;
a phase learning means for learning a phase error amount which is a phase difference between a sawtooth waveform indicating variations in the servo information number read by the head and a sinusoidal wave indicating variations in the amount of eccentricity of the disk;
a subtraction means for detecting a positional error of the head on the basis of a target position of the head that is supplied from the outside, and the current position of the head;
a sinusoidal wave generation means for generating an eccentricity sync sinusoidal wave having the phase error amount learned by the phase learning means, at a frequency synchronized with the rotation frequency of the disk;
an eccentricity control amount calculation means for calculating a weight factor on the basis of the eccentricity sync sinusoidal wave and the positional error of the head, and multiplying the eccentricity sync sinusoidal wave by the weight factor to obtain an eccentricity control amount;
a positioning control means for controlling positioning of the head on the basis of the positional error of the head and the eccentricity control amount;
an impact detection means for outputting a voltage according to an impact that is applied to the disk device from the outside; and
an eccentricity learning switching judgement means for making the eccentricity control amount calculation means stop calculation of weight factor when the voltage outputted from the impact detection means exceeds a predetermined value.

8. A disk eccentricity control method comprising:
previously storing a phase error amount which is a phase difference between a sawtooth waveform indicating variations in the servo information number read by the head and a sinusoidal wave indicating variations in the amount of eccentricity of the disk, and a weight factor of each of plural areas into which the disk is concentrically divided; and
during a settling operation, reading a phase error amount and a weight factor corresponding to a target position of the head from the phase error amounts and the weight factors which have previously been stored, and calculating an eccentricity control amount using the phase error amount and the weight factor which have been read out.

9. A disk eccentricity control method comprising:
previously storing a phase error amount which is a phase difference between a sawtooth waveform indicating variations in the servo information number read by the head and a sinusoidal wave indicating variations in the amount of eccentricity of the disk, and an approximate expression which expresses the relationship between a weight factor of each of plural areas into which the disk is concentrically divided and a target position of the head; and
during a settling operation, reading a phase error amount and an approximate expression corresponding to the target position of the head from the phase error amounts and the approximate expressions which have previously been stored, and calculating a weight factor corresponding to the target position of the head from the read approximate expression, and further, calculating an eccentricity control amount using the calculated weight factor and the read phase error amount.

10. A disk eccentricity control method comprising:
previously storing a phase error amount which is a phase difference between a sawtooth waveform indicating variations in the servo information number read by the head and a sinusoidal wave indicating variations in the amount of eccentricity of the disk, and a weight factor of each of plural areas into which the disk is concentrically divided on each of disk surfaces read by plural heads, respectively; and
during a head switching operation, reading a phase error amount and a weight factor corresponding to the target position of the head after the head switching, from the phase error amounts and the weight factors which have previously been stored, and calculating an eccentricity control amount using the phase error amount and the weight factor which have been read out.

11. A disk eccentricity control method comprising:
previously storing a phase error amount which is a phase difference between a sawtooth waveform indicating variations in the servo information number read by the head and a sinusoidal wave indicating variations in the amount of eccentricity of the disk, and a phase error amount and a weight factor corresponding to each of plural areas into which each of plural disks is concentrically divided; and during a head switching operation to a head on a different disk, reading a phase error amount and a weight factor corresponding to the target position of the head after the head switching, from the phase error amounts and the weight factors which have previously been stored, and calculating an eccentricity control amount using the phase error amount and the weight factor which have been read out.

12. A disk eccentricity control method comprising:

calculating a positional error and a remaining distance of a head on the basis of a target position of the head which is externally input, and a current position of the head;

calculating a target speed according to the remaining distance of the head;

calculating an actual moving speed of the head;

calculating a speed error of the head on the basis of the actual moving speed and the target speed of the head;

previously storing a phase error amount which is a phase difference between a sawtooth waveform indicating variations in the servo information number read by the head and a sinusoidal wave indicating variations in the amount of eccentricity of the disk, and a weight factor corresponding to each of plural areas into which the disk is concentrically divided; and during a seek operation, calculating an eccentricity control amount using a phase error amount and a weight factor which correspond to the current position of the head and are previously stored, and controlling positioning of the head using the calculated eccentricity control amount and the calculated speed error of the head.

13. A disk eccentricity control method comprising:

calculating a positional error of a head on the basis of a target position of the head which is supplied from the outside, and a current position of the head;

calculating an amount of change in the positional error of the head; and stopping calculation of weight factor when the calculated amount of change in the positional error of the head exceeds a predetermined value.

14. A disk eccentricity control method comprising:

detecting an impact applied from outside a device;

converting the detected impact into a voltage, and outputting the voltage; and stopping calculation of weight factor when the outputted voltage exceeds a predetermined value.

15. A recording medium on which a program is recorded, said program comprising:

previously storing a phase error amount which is a phase difference between a sawtooth waveform indicating variations in the servo information number read by a head and a sinusoidal wave indicating variations in the amount of eccentricity of a disk, and a weight factor of each of plural areas into which the disk is concentrically divided; and during a settling operation, reading a phase error amount and a weight factor corresponding to a target position of the head from the phase error amounts and the weight factors which have previously been stored, and calculating an eccentricity control amount using the phase error amount and the weight factor which have been read out.

16. A recording medium on which a program is recorded, said program comprising:

previously storing a phase error amount which is a phase difference between a sawtooth waveform indicating variations in the servo information number read by a head and a sinusoidal wave indicating variations in the amount of eccentricity of a disk, and an approximate expression which expresses the relationship between a weight factor of each of plural areas into which the disk is concentrically divided and a target position of the head; and during a settling operation, reading a phase error amount and an approximate expression corresponding to the target position of the head from the phase error amounts and the approximate expressions which have previously been stored, and calculating a weight factor corresponding to the target position of the head from the read approximate expression, and further, calculating an eccentricity control amount using the calculated weight factor and the read phase error amount.

17. A recording medium on which a program is recorded, said program comprising:

previously storing a phase error amount which is a phase difference between a sawtooth waveform indicating variations in the servo information number read by a head and a sinusoidal wave indicating variations in the amount of eccentricity of a disk, and a weight factor of each of plural areas into which the disk is concentrically divided on each of disk surfaces that are read by plural heads, respectively; and during a head switching operation, reading a phase error amount and a weight factor corresponding to the target position of the head after the head switching, from the phase error amounts and the weight factors which have previously been stored, and calculating an eccentricity control amount using the phase error amount and the weight factor which have been read.

18. A disk eccentricity control method comprising:

previously storing a phase error amount which is a phase difference between a sawtooth waveform indicating variations in the servo information number read by a head and a sinusoidal wave indicating variations in the amount of eccentricity of a disk, and a phase error amount and a weight factor corresponding to each of plural areas into which each of plural disks is concentrically divided; and during a head switching operation to a head on a different disk, reading a phase error amount and a weight factor corresponding to the target position of the head after the head switching, from the phase error amounts and the weight factors which have previously been stored, and calculating an eccentricity control amount using the phase error amount and the weight factor which have been read out.

19. A recording medium in which a program is recorded, said program comprising:

calculating a positional error and a remaining distance of a head on the basis of a target position of the head which is externally input, and a current position of the head;

calculating a target speed according to the remaining distance of the head;

calculating an actual moving speed of the head;

calculating a speed error of the head on the basis of the actual moving speed and the target speed of the head;

previously storing a phase error amount which is a phase difference between a sawtooth waveform indicating variations in the servo information number read by the head and a sinusoidal wave indicating variations in the amount of eccentricity of a disk, and a weight factor corresponding to each of plural areas into which the disk is concentrically divided; and during a seek operation, calculating an eccentricity control amount using a phase error amount and a weight factor corresponding to the current position of the head, which have previously been stored, and controlling positioning of the head using the calculated eccentricity control amount and the calculated speed error of the head.

20. A recording medium in which a program is recorded, said program comprising:

calculating a positional error of a head on the basis of a target position of the head which is supplied from the outside, and a current position of the head;

calculating an amount of change in the positional error of the head; and stopping calculation of weight factor when the calculated amount of change in the positional error of the head exceeds a predetermined value.

21. A recording medium in which a program is recorded, said program comprising:

detecting an impact applied from outside a device;

converting the detected impact into a voltage, and outputting the voltage; and stopping calculation of weight factor when the outputted voltage exceeds a predetermined value.

* * * * *